United States Patent
Dagar et al.

(10) Patent No.: US 10,452,485 B2
(45) Date of Patent: Oct. 22, 2019

(54) SYSTEM AND METHOD FOR SELECTIVE COMPRESSION IN A DATABASE BACKUP OPERATION

(71) Applicant: International Business Machines Corporation, Armonk, NY (US)

(72) Inventors: Prashant Dagar, Gurgaon (IN); Neeraj Gaurav, Bangalore (IN); Kelly D. Rodger, Unionville (CA); Tapas Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 14/946,880

(22) Filed: Nov. 20, 2015

(65) Prior Publication Data
US 2016/0188419 A1    Jun. 30, 2016

(30) Foreign Application Priority Data
Dec. 29, 2014    (CA) .................................... 2876468

(51) Int. Cl.
*G06F 11/14*    (2006.01)
*G06F 16/22*    (2019.01)

(52) U.S. Cl.
CPC ...... *G06F 11/1451* (2013.01); *G06F 16/2282* (2019.01); *G06F 2201/80* (2013.01); *G06F 2201/84* (2013.01)

(58) Field of Classification Search
USPC .......................................................... 707/654
See application file for complete search history.

(56) References Cited

U.S. PATENT DOCUMENTS

| 7,330,997 B1* | 2/2008 | Odom ................. G06F 11/1464 711/162 |
| 8,140,480 B1* | 3/2012 | Tsaur .................. G06F 11/1464 707/648 |
| 8,386,444 B2 | 2/2013 | Kraus et al. |

(Continued)

FOREIGN PATENT DOCUMENTS

CA    2876468    12/2014

OTHER PUBLICATIONS

"Sybase ASE—Lightweight Compression for Backup Server", Sybase, Copyright © 2009, Printed Sep. 16, 2015, 68 pages.

*Primary Examiner* — Cam Linh T Nguyen
(74) *Attorney, Agent, or Firm* — Christopher K. McLane

(57) ABSTRACT

Differential or selective elective data transformation, which can include compression and/or encryption, is applied to selected data subsets, such as selected table spaces, of a database during a single database operation. In response to a received backup command, a backup utility of a database management system obtains data from a number of data subsets of a source database that are specified for inclusion in a backup image. At least one of the data subsets is specified for data transformation while subsets are not. The data from the specified data subsets is identified in the obtained data, and transformed prior to writing a single backup image to archive media. The backup image therefore contains both transformed and untransformed data. The selection of data subsets for transformation can be made automatically without requiring user specification according to predefined data characteristics including subset size, data type, compressibility, or encryption.

20 Claims, 11 Drawing Sheets

(56) References Cited

U.S. PATENT DOCUMENTS

| | | | |
|---|---|---|---|
| 8,639,671 B2 | 1/2014 | Luo et al. | |
| 8,832,044 B1* | 9/2014 | Gipp | G06F 21/6227 |
| | | | 707/693 |
| 9,372,760 B1* | 6/2016 | Tsaur | H04L 69/40 |
| 2003/0041110 A1* | 2/2003 | Wenocur | G06Q 10/107 |
| | | | 709/206 |
| 2007/0168715 A1* | 7/2007 | Herz | G06F 11/1441 |
| | | | 714/13 |
| 2008/0208929 A1* | 8/2008 | Phillipi | G06F 11/1451 |
| 2008/0253573 A1* | 10/2008 | Sakurai | H04N 1/32609 |
| | | | 380/278 |
| 2012/0134491 A1* | 5/2012 | Liu | G06F 21/602 |
| | | | 380/28 |
| 2012/0198154 A1* | 8/2012 | Keith, Jr. | G06F 11/1448 |
| | | | 711/115 |
| 2013/0166861 A1* | 6/2013 | Takano | G06F 3/0608 |
| | | | 711/161 |
| 2014/0013068 A1* | 1/2014 | Yamato | G06F 3/0608 |
| | | | 711/154 |
| 2014/0074805 A1 | 3/2014 | Kapoor et al. | |
| 2014/0281545 A1* | 9/2014 | Erofeev | G06F 21/6218 |
| | | | 713/171 |

* cited by examiner

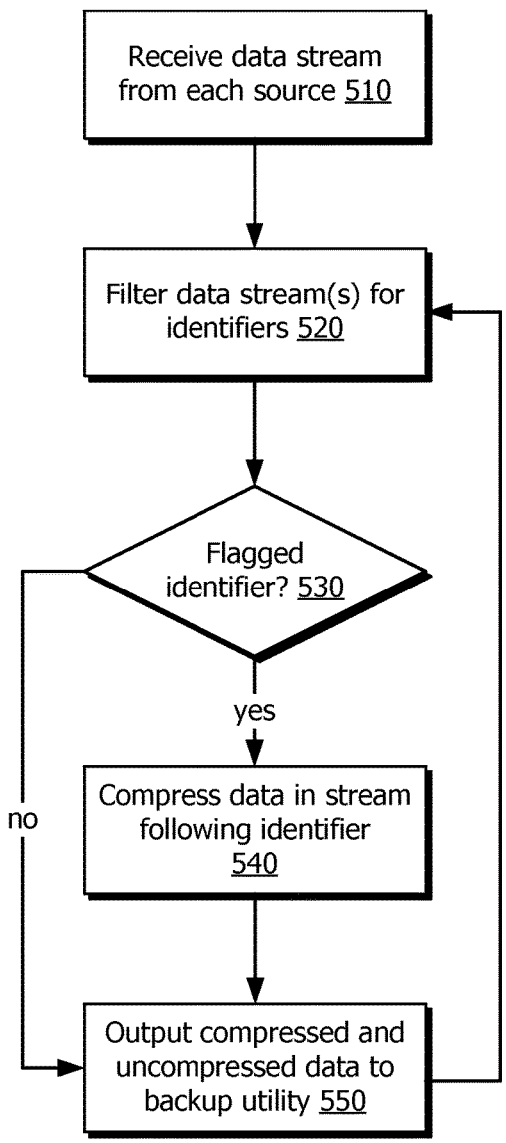
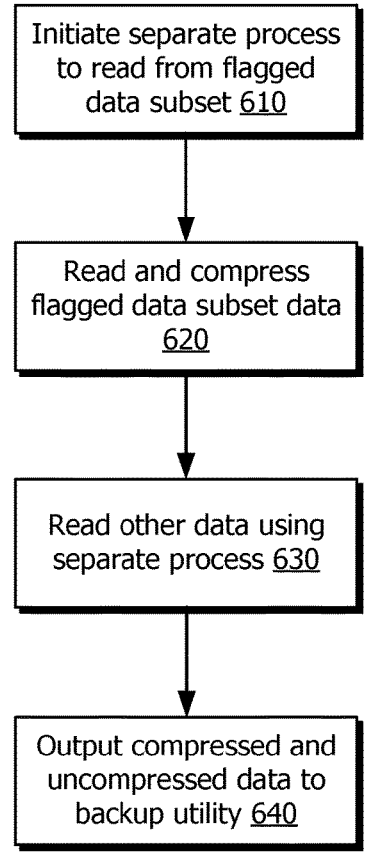
FIG. 5
FIG. 6

SYSTEM AND METHOD FOR SELECTIVE COMPRESSION IN A DATABASE BACKUP OPERATION

BACKGROUND OF THE INVENTION

The present application relates generally to the configuration and operation of database management systems, and in particular to compression and backup of a database to a backup image.

Database management systems frequently include backup functions for producing backup images and/or file copies of databases or select datasets of a database. A primary use of backup images or copies is restoration of data to a previous or last known good state. For example, in the case of disaster recovery, recovering from application or user errors, and as a safeguard against hardware, software, or other failures in a computer system. The backup image or copy may be used to restore the data in the database to the state it was in at the time the backup image or copy was made. Backup images and copies may be made and retained for other purposes, such as compliance with legal or regulatory requirements concerning retention of data.

Typically, backup functions are executed on a periodic basis, such as daily, weekly, or monthly, according to the requirements of a disaster recovery or other policy governing operation of the database management system. In some cases, the policy may require creation of redundant backup images to be stored in different physical locations or on different media in the event one physical location or medium is compromised. In other cases, multiple backup images created at different times (e.g., the current week's backup, and the previous week's backup) are retained against the possibility that an error may occur in a given backup.

Whatever backup and retention policy is followed in managing a database, the generation of backup copies is resource intensive in that the backup image may consume a considerable amount of storage space; a backup image may be equal in size to the original database. Thus, a number of database management systems offer a compression function, which compresses the data for the backup image. While compression potentially reduces the final size of the backup image, the computation process also consumes extra processor time.

SUMMARY

The embodiments and examples described below accordingly provide a method, system, and machine-readable medium presenting improvements in a database management system backup utility. In one embodiment, there is provided a method of selectively transforming data during a database backup, the method comprising: in response to a received backup command for a database: obtaining data from a plurality of data subsets of the database, the plurality of data subsets being specified for inclusion in a backup image, at least one of the plurality of data subsets being specified for transformation; identifying the data from the specified at least one data subset; transforming the identified data; and outputting both the transformed data and untransformed data obtained from at least another one of the plurality of data subsets to a single backup image.

In one aspect, the transformation comprises compression, the transformed data comprising compressed data, and the untransformed data comprising uncompressed data.

In another aspect, the transformation comprises encryption, the transformed data comprising encrypted data, and the untransformed data comprising unencrypted data.

In a further aspect, the plurality of data subsets comprise a plurality of logical storage units defined for the database, the single backup image thus comprising transformed data from at least one logical storage unit and untransformed data from at least one other logical storage unit. The plurality of logical storage units may comprise a plurality of table spaces.

In still another aspect, obtaining the data comprises executing one or more threads to obtain one or more datastreams from the plurality of data subsets; identifying the data comprises locating, in at least one of the one or more datastreams, data corresponding to an identifier for the specified at least one data subset, the transformed data being generated from the datastream data corresponding to the identifier while remaining datastream data is untransformed; and outputting both the transformed data and untransformed data comprises writing the transformed data and the untransformed data to a backup utility buffer.

In yet another aspect, obtaining the data comprises executing a first thread to obtain a datastream from the specified at least one data subset and executing a second thread to obtain a datastream from the least another one of the plurality of data subsets, the transformed data being generated from the datastream obtained by the first thread, while the datastream obtained by the second thread is untransformed; and outputting both the transformed data and untransformed data comprises writing the transformed data and the untransformed data to a backup utility buffer.

In still a further aspect, obtaining the data comprises executing one or more threads to obtain one or more datastreams from the plurality of data subsets and writing the datastreams to a backup utility buffer; identifying the data comprises locating, in the backup utility buffer, data corresponding to an identifier for the specified at least one data subset, the transformed data being generated from the buffer data corresponding to the identifier while remaining buffer data is untransformed; and outputting both the transformed data and untransformed data comprises writing the transformed data and the untransformed data to the single backup image.

The received backup command may specify which one or more of the plurality of data subsets of the database are to be transformed, and identifying the data may comprise identifying the one or more data subsets specified in the received backup command. In another aspect, in response to the received backup command the at least one of the plurality of data subsets for transformation is specified based on a data subset characteristic, the data subset characteristic comprising one or more of a threshold size, a type of data comprised in the data subset, a compressibility factor assessed for the data subset, or encryption of the data in the data subset. The data that is transformed may have been previously compressed, for example at a table level in the database.

There is also provided a data processing system-readable medium, which may be physical or non-transitory, bearing code which, when executed by one or more processors of a data processing system, causes the data processing system to implement the method and variations discussed herein.

There is further provided a database management system configured to provide selective compression during a database backup, the database management system comprising: a communications interface component executable by one or more processors of the database management system configured to receive a backup command for a database; a buffer manager component executable by the one or more processors to obtain, in response to the received backup command, data from a plurality of data subsets of the database, the plurality of data subsets being specified for inclusion in a backup image, at least one of the plurality of data subsets being specified for transformation; a transformation utility executable by the one or more processors to identify the data from the specified at least one data subset and transform the identified data; and a write manager component executable by the one or more processors to output both the transformed data and untransformed data obtained from at least another one of the plurality of data subsets to a single backup image.

BRIEF DESCRIPTION OF THE DRAWINGS

FIGS. 5 and 6 are flowcharts illustrating methods of selectively compressing data, in accordance with the operation depicted in FIG. 4;

DETAILED DESCRIPTION

The embodiments and examples described below accordingly provide improved functionality in a database management system or a backup utility in a database management system, whereby differential or selective data transformation, such as compression and/or encryption, is applied to table spaces or other data subsets during a database backup operation, such that a single database image containing both transformed and untransformed data can be generated in response to a single backup command.

Figure 1:
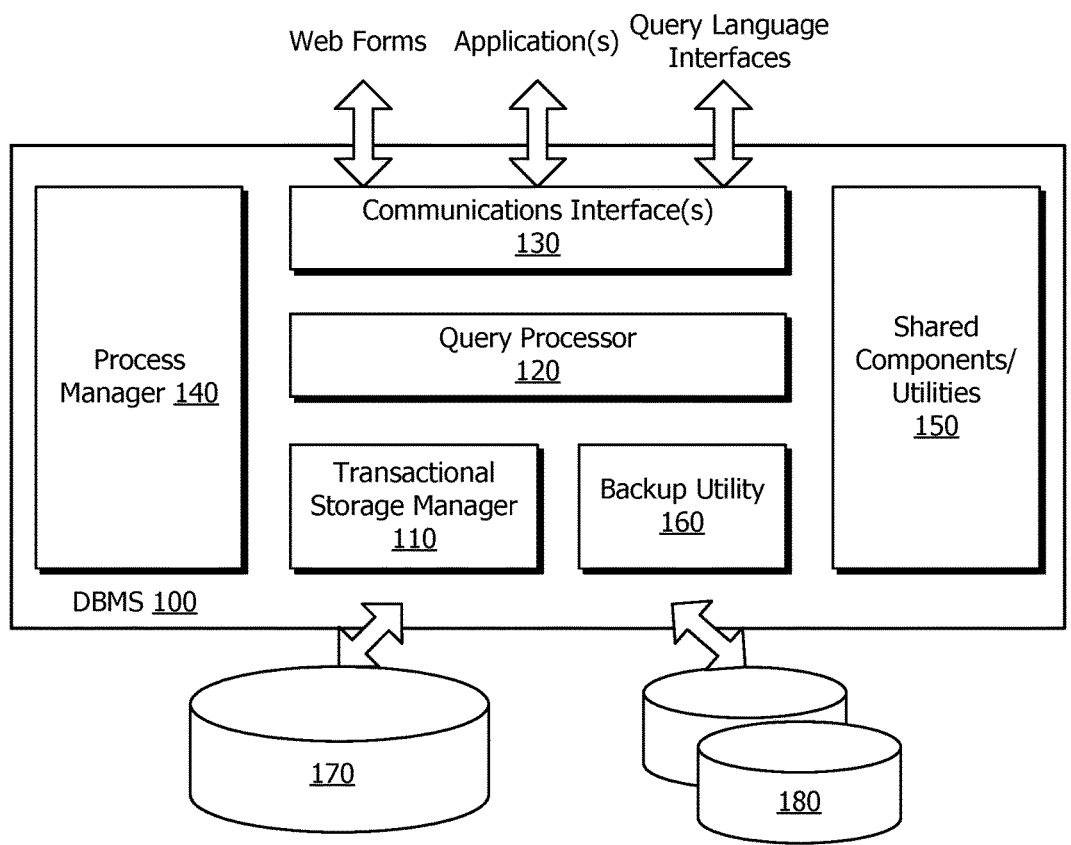
FIG. 1 is a schematic diagram illustrating select components of a database management system for use with the described examples and embodiments.
Figure 2:
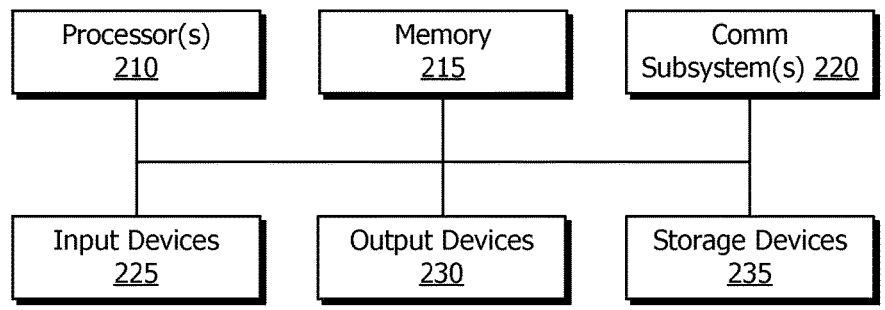
FIG. 2 is a block diagram of an example data processing system for use with the database management system illustrated in FIG. 1.

These embodiments and examples are described and illustrated primarily in the context of an example database management system 100, illustrated in FIG. 1, which may be implemented on one or more data processing systems, such as the system 200 depicted in FIG. 2. FIG. 1 depicts select components of a typical database management system 100 that may be configured to implement the various examples described herein. The construction, configuration, and operation of databases and database management systems will be known to those skilled in the art; thus, FIG. 1 is intended only to provide a general overview representative of particular aspects of a database management system 100, and specific components typically included in such systems have been excluded for brevity. Similarly, as the person skilled in the art understands the configuration and operation of data processing systems, FIG. 2 only depicts representative aspects of a suitable data processing system 200. The database management system 100 and data processing system 200 may be successfully used with the various examples and embodiments described herein, even if some components described in FIG. 1 or 2 are omitted or substituted. In short, the example systems 100 and 200 illustrated in FIGS. 1 and 2 are not intended to be exhaustive or limiting.

The example database management system 100 of FIG. 1 can include a transactional storage manager 110 responsible for managing all access to and manipulation of data in associated databases 170, or access and writing to one or more archive media 180 storing copies or backup images of databases, or portions thereof. The transactional storage manager 110 can include one or more buffer managers controlling writing and reading from and to repositories, such as the databases 170 and archive media 180, including the spawning of one or more process threads for obtaining or writing data from and to different connected devices; it may also include an access control module and a lock manager to control access to databases and to avoid interference by concurrent processes. A communications interface(s) 130 manages communication between clients (represented by web forms, applications, or structure query language interfaces; other types of client applications or systems will be known to those skilled in the art) and the other components of the database management system 100. The process manager 140 manages the allocation of database management system resources (e.g., thread allocation) and controls when queries are processed or other tasks are executed. When queries are processed, they are handled by the query processor 120, which can include authorization modules (to determine whether the user or client making a query is authorized), compilers to compile received queries into a query plans and implement operators for the query plans (e.g., joins, selection, aggregation, sorting, etc.). Operators may retrieve or manipulate data from databases 170 via the transactional storage manager 110. Additional shared components/utilities 150, such as catalog managers, memory managers, and batch utilities, can also be included as modules of the database management system 100. In addition, a backup utility 160 can also be included in the database management system 100 or provided as a separate module. If included in the database management system 100, it may make use of the transactional storage manager 110 and shared component/utilities 150, and its execution may be invoked via the communications interface(s) 130 and controlled by the process manager 140. The backup utility 160 may write backup files (whether backup images or file copies) to the archive media 180 and retrieve the backup files from the archive media 180 to perform recovery operations. As noted above, the configuration and operation of database management system 100, including backup utility 160, will be known to those skilled in the art.

The components of the database management system 100 may be distributed over a network; and thus, certain components may be considered logically or geographically "remote" from one another, or remote from the databases 170 and archive media 180. For example, the backup utility 160 in particular may be implemented on a separate data processing system 200 from other components of the database management system 100, and the archive media 180, in particular, may be located remotely from the backup utility 160 and the rest of the database management system 100, for instance in a physically secure facility.

The database management system 100 and components thereof may be implemented using one or more data processing systems 200, such as computers or similar devices. FIG. 2 illustrates select components of a data processing system 200, including one or more processor(s) (e.g., microprocessors) 210 operatively connected via a bus to one or more memory 215, which can include volatile and nonvolatile memory devices; comm subsystem(s) 220, which can include network adaptors for communicating with other data processing systems 200 or other components of the database management system 100; input devices 225 and output devices 230, which can include conventional user input and output devices, such as pointing devices, touch devices, touchscreens, display monitors, speakers, microphones, and the like. The data processing system 200 can also include integrated or storage devices 235, which can include physical media hosting the databases 170 or archive media 180. Operations of the data processing system 200 may be controlled by an operating system and other applications stored in the memory 215 or on storage devices 235. As noted above, the configuration and operation of a typical data processing system 200 will be known to those in the art.

In a database management system 100, it is generally considered good practice to implement a backup and/or retention policy to ensure that backup versions of database data are available for use in the event of disaster recovery or in order to comply with regulatory or other requirements regarding retention of data. As alluded to above, however, backup operations can be resource intensive. The backup process will consume processing resources within the database management system 100 in reading data from databases 170 and writing the data to the destination archive media 180. These processing resources may have otherwise been made available for queries or other functions of the database management system 100.

In addition, sufficient storage space must be made available to store the desired backup images or file copies. As a space-saving measure, many database management systems provide options for data compression within tables of a database. Compression within a database table (e.g., row compression or value compression) may have limited effect on the consumption of storage space when the additional metadata generated to manage the table compression is significant compared to the space saved within the table. Many database management systems also offer a backup compression option, whereby an entire backup image or file is compressed. The compressed backup image would then occupy less storage space on the physical media. Compression, however, comes with an additional processing cost due to the execution of the compression algorithm on the data to be written to the backup image. If the compressed data must subsequently be restored to the database, then additional processing resources will be required to decompress the data.

Thus, when choosing to compress a database backup image, the increased consumption of processor resources is balanced against the space savings realized by the smaller footprint of the backup image. However, in some cases compression may result in uncertain or insignificant gain, for instance in the case where a table space of a database contain less compressible data (e.g., large objects, such as binary files that are already in a compressed format), or where a table space has a smaller raw size. In the first case, little compression may result from executing the compression algorithm; in the second, while the table space may be effectively compressed, the resultant space savings may be trivial when compared to the overall size of the compressed database.

Table 1 illustrates these issues in an example hypothetical database PRODDB, containing five table spaces (TBSP1 through 5) storing persistent user data, and a further table space (SYSCATSPACE) storing catalog metadata. In this case, it is presumed that the selected compression algorithm results in an average 60% compression ratio across the table spaces with the exception of TBSP3, which contains files that do not respond as well to the selected compression algorithm, resulting in an approximate 15% compression. The columns of Table 1 include the original size of the table space in GB; the size after compression; the approximate storage savings in GB (original size less compressed size); and the approximate percentage savings in space, computed by comparing the approximate storage savings against the raw total size of the uncompressed database, 35.3 GB:

TABLE 1

Outcome of compression on table spaces on database PRODDB

| ID | Name | Size (GB) | Compressed Size (GB) | Approx. Storage Savings (GB) | % Savings |
|----|------|-----------|----------------------|------------------------------|-----------|
| 1 | SYSCATSPACE | 0.1 | 0.04 | 0.06 | 0.2 |
| 2 | TBSP1 | 20 | 8.0 | 12 | 34 |
| 3 | TBSP2 | 2.0 | 0.8 | 1.2 | 3.4 |
| 4 | TBSP3 | 12 | 10.2 | 1.8 | 5.1 |
| 5 | TBSP4 | 0.5 | 0.02 | 0.48 | 1.4 |
| 6 | TBSP5 | 0.7 | 0.28 | 0.42 | 1.2 |

Table spaces TBSP1 and TBSP3 are heavily loaded with data compared to the other table spaces; however, the gain realized by compressing these two table spaces varies. In the case of TBSP1 a reduction of 12 GB in size is realized, which is equivalent to approximate 34% of the original total size of the database. In the case of TBSP3, however, only 1.8 GB of space was saved, amounting to 5.1% of the original total size of the database. Compression of TBSP1 and TBSP3 produce the biggest benefit in terms of size reduction, but the processing time required to reduce TBSP3, in some cases, may not be considered worth the space savings. Similarly, the gain realized by compressing SYSCATSPACE, TBSP2, TBSP4, and TBSP5 is relatively small compared to the original size of the database, as the space saved by each constitutes less than 5% of the original size of the database. Still further, compression of SYSCATSPACE, TBSP4, and TBSP5 together may be considered not worth compressing since these three table spaces together amount to less than 2 GB when uncompressed. Thus, the extra processor time required to compress the smaller table spaces may be considered insufficient to justify the corresponding space savings, in view of the larger savings realized by compressing TBSP1.

In short, depending on the space available for a backup operation and concurrent demands on the processor, the compression of some table spaces within a given database may be considered to be a waste of processor cycles when both backing up and restoring the database. However, the backup utilities in database management systems generally present an all-or-nothing approach to compression in a backup operation: either the entire data set designated for backup is compressed, or none of the data is compressed during the backup operation.

A possible workaround to this shortcoming in current database backup utilities is to execute two separate backup operations: one operation for the table spaces slated for compression, and a separate operation for the table spaces to be excluded from compression. However, this workaround results in two distinct backup images, and requires execution of two separate backup operations, which results in various inefficiencies. For example, both backup images may have a certain amount of common data and metadata, which is therefore duplicated, increasing the total storage space occupied by the two backup images. Secondly, maintenance of the backup images is likely doubled, as two backup images must be tracked, deleted, etc. as part of regular maintenance, rather than only one. This particular burden is exacerbated in a partitioned database environment. Furthermore, multiple backup operations results in multiple timestamps for the backup images generated by the distinct operations; this may result in the backup images being associated with different starting log sequence numbers, which can complicate the recovery process. Finally, since two backup operations are required to back up a set of table spaces or other database components, it follows that two restore operations may be required during recovery. Moreover, where multiple backups are implemented at the table space level (vs. a database level backup), it may be necessary to access transactional logs stored in different backup images, along with transactional logs stored externally that were generated between the two backup operations. All of the foregoing considerations add to the overall backup and/or restore process overhead for both the database management system and administrators and slow the backup and/or restore process overall.

Similar considerations may also apply when other forms of data transformation, such as encryption, are to be applied to backup data. Generally, data transformation incurs some additional processor and/or time overhead that can delay the overall backup process or interfere with other tasks executed by the database management system 100.

Accordingly, in an embodiment of the database management system 100 and backup utility 160 described herein, functionality is provided to enable differential or selective transformation of data across table spaces (or other data subsets of a database) in a single backup operation, in response to a single backup command. The backup operation can, therefore, be implemented as a database-level backup (i.e., where an entire database is backed up in a single image) rather than a table space-level backup (where portions of a database are backed up in separate images). The differential or selective transformation of data can include compression, encryption, conversion from one type or format to another, or a combination of the two.

Figure 3:
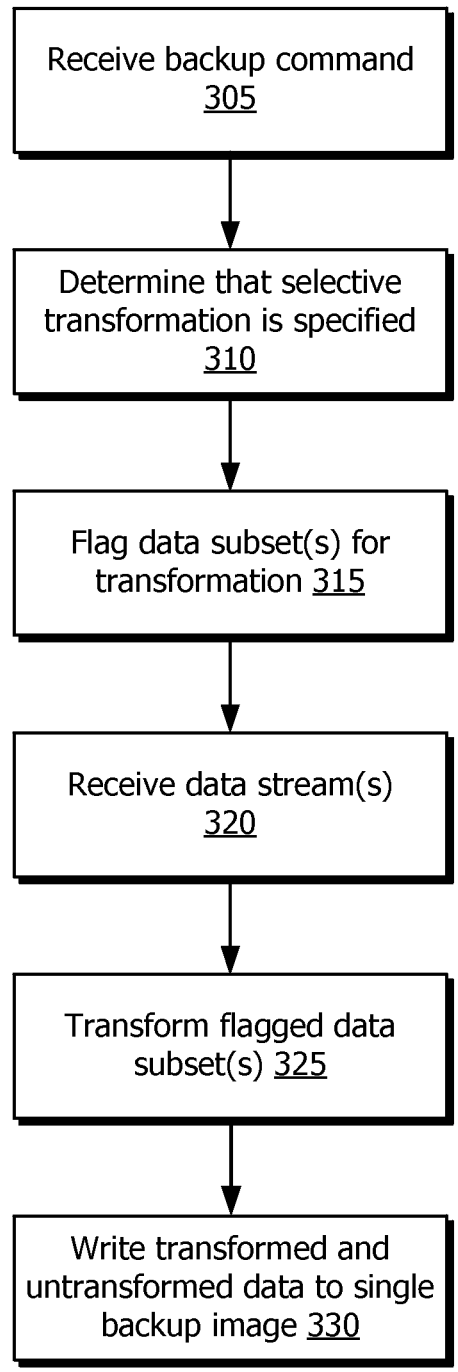
FIG. 3 is a flowchart illustrating an overview method of selectively compressing data within a single database image.

An example overview method 300 for implementing differential or selective data transformation in a backup utility 160 of a database management system 100 is illustrated in FIG. 3. At 305, a backup command is received. The backup command may be an enhancement of an existing BACKUP command, for example:

BACKUP DATABASE <database_alias> [TABLESPACE (tablespace1 [, tablespace2, tablespace3, . . . )] [COMPRESS [ALL|(tablespace1 [, tablespace2, tablespace3, . . . )|EXCEPT (tablespace1 [, tablespace2, tablespace3, . . . )]

where, in a single line command, BACKUP DATABASE <database_alias> is the backup command, which invoked without any optional parameters initiates a backup operation for the database specified by <database_alias> to generate a backup image according to any predefined default settings (e.g., whether transformation, such as compression, is enabled for the database image, the destination volume, etc.); the TABLESPACE option, when invoked as part of the BACKUP command, permits the user to specify which one or more particular table spaces (e.g., tablespace1, tablespace2, etc.) are to be included in the backup image; and a further option for invoking differential or selective compression. In this example, the option is a COMPRESS option for compressing data. (An example option for encryption may be ENCRYPT). The COMPRESS option may be invoked to expressly specify that all table spaces specified for the backup image are to be compressed (COMPRESS ALL); specify specific table spaces to be compressed, in which case unspecified table spaces are automatically excluded from compression (COMPRESS tablespace1, etc.); or to identify a specific one or more table spaces to be excluded from compression (COMPRESS EXCEPT tablespace1, etc.).

The options listed above are nestable; when the COMPRESS option is invoked, it operates on any specified table spaces identified in the TABLESPACE option; thus, if TABLESPACE is not invoked, COMPRESS ALL would act on all table spaces in the specified database. When a received backup command is processed by the database management system 100 (for example, by the query processor 120), the specified inclusions or exceptions in the COMPRESS option are validated against the table spaces present in the database if no subset of table spaces is specified by TABLESPACE, or against the table spaces specified by TABLESPACE if invoked. An error would be returned if the inclusions or exclusions in COMPRESS did not match the table spaces specified for inclusion in the backup image.

Variations of this example BACKUP command and its implementation are possible. It should be noted that in this example and the various examples discussed below, that it is contemplated that differential or selective data transformation will be applied to different table spaces within a given database. Table space-level differentiation is used in the examples here since, as those skilled in the art will appreciate, the table space typically represents a logical storage unit in database design and is used to allocate storage for the various segments of a database (e.g., tables, indexes, large objects, etc.) across physical media. A logical storage unit represents an intermediate level of abstraction between the physical files and the database schema and may be used to group together segments that should be backed up or restored together. However, it will be understood by those skilled in the art that the embodiments and examples herein may be applied with appropriate modification to different levels of logical differentiation within the database; for example, to tables within a single table space selected for backup or to specific types of database segments (for example, to specifically include or exclude large objects from compression). The discussion below thus refers to data subsets of the database, which is intended to refer to logical storage units, such as table spaces.

The described examples contemplate that the selective data transformation is implemented to either "turn on" transformation for select table spaces (or other data subsets) or "turn off" transformation for others within the same backup image. In another variation, the selective transformation option may be used to apply different types of data transformation to different table spaces. For example, a more computationally intensive but more effective compression algorithm may be applied to certain data subsets that are considered more difficult to compress, while a less computationally intensive algorithm is applied to the remaining data subsets that are easier to compress. As another example, encryption may be applied to some data subsets containing data considered more secure or private, while no encryption, or compression, is applied to other data subsets.

Returning to FIG. 3, once the backup command is received, a determination is made (e.g., by the query processor or other database management system component parsing the command) that selective data transformation has been specified for the backup operation, and for which data subsets, at 310. This determination may be made based on explicitly set options, as discussed above, or else based on default selective transformation settings set in the backup utility 160 or database management system 100. When selective data transformation is specified, the data subsets specified for compression are flagged. For example, a record or file is stored, at least temporarily, specifying the data subsets flagged for compression in the backup image by identifier (e.g., table space name, where the data subset is a table space) at 315. Alternatively, the identifiers of data subsets flagged for exclusion may be stored. It will be appreciated that as part of the backup operation, additional metadata can be created and stored for the backup image specifying which data subsets have been transformed (or not), and which type of transformation was used.

At 320, the backup operation commences, and one or more data streams are retrieved from the databases 170 for writing to a buffer for further processing. The threads or processes executing the retrieval of the data streams and managing the buffer can be controlled by the transactional storage manager 110 in the database management system 100 or else specifically by the backup utility 160. The number of threads may be determined according to available processing resources and any specified level of parallelism.

Prior to writing the database data to the backup image, the flagged data subsets are identified either from the data stream(s) or after retrieval from the buffer and transformed at 325. The transformation step may occur at different stages during the backup operation, as discussed below. Finally, at 330, the transformed and untransformed data subsets are written to a single backup image. The single backup image, as noted above, can include metadata for the selective transformation.

The transformation operation may be invoked within the backup utility or by a transformation agent operating outside the backup utility. The database management system 100 may include interfaces that can be called by the backup utility 160 to implement different types of data transformation, such as encryption or compression, so selective transformation may be selected for any type of data transformation implemented by the database management system 100. The following discussion provides examples of selective compression as it may be implemented in a database management system, but it will be appreciated by those skilled in the art that these examples may be applied, with suitable modification to those known in the art, to other forms of data transformation.

Figure 4:
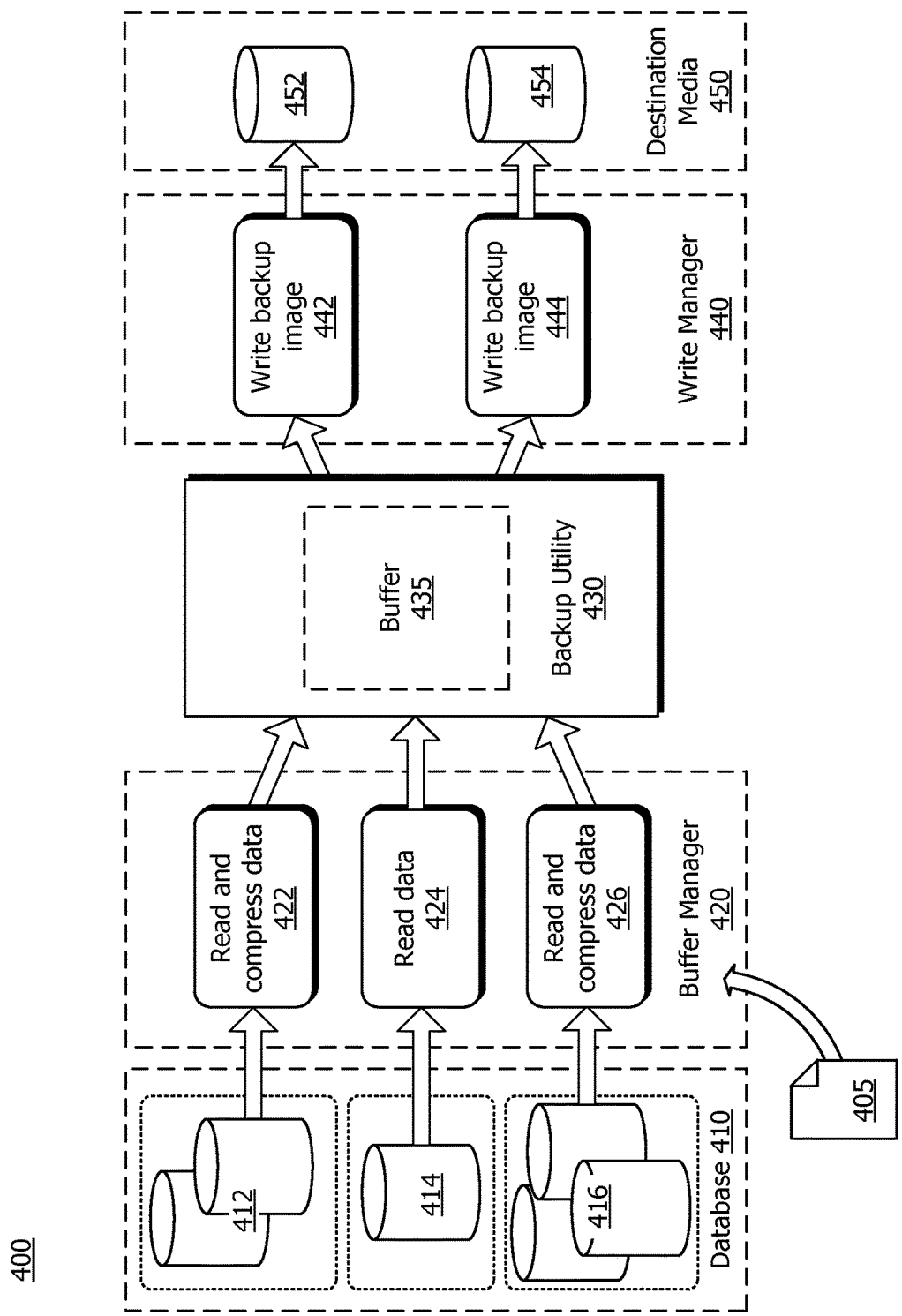
FIG. 4 is a schematic diagram illustrating operation of an example database management system implementing selective compression, in accordance with a first example.

FIG. 4 illustrates select operation of an example database management system 400 in an implementation where compression is invoked prior to the data subsets being received by a backup utility. In this example, database management system 400, a database 410 includes a number of data subsets (e.g., table spaces) 412, 414, 416. A buffer manager 420 in the database management system 400 executes one or more processes 422, 424, 426 to read in data from the data subsets to be backed up. In this case, the buffer manager 420 includes a further process that filters the data streams for data subset identifiers (e.g., table space identifiers or names) and compares them to a set of identifiers of data subsets flagged for compression 405. When a flagged identifier is detected, a compression utility is invoked for the data stream carrying the flagged data. In this example, a streaming compression algorithm may be applied to the data stream; alternatively, the portion of the data stream containing the flagged data is temporarily stored and compressed, then streamed into the buffer 435 of the backup utility 430. Thus, in this example, process block of read and compress data 426 represents a combination of processes operating on streamed data. In another example implementation, when selective compression is invoked for the backup operation, one or more threads of read and compress data 426 are invoked specifically for those data subsets flagged for compression, so that the data to be compressed is segregated in a different data stream from the data that is not compressed. Data that does not correspond to a flagged identifier is passed through from the data stream to the buffer 435.

Once received by the buffer 435, the backup utility 430 can then process the data set in the usual manner, for example, multiplexing the backup data across multiple write threads, such as write backup image 442, write backup image 444, managed by a write manager 440 component of the database, which in turn writes the backup image to destination media 450. FIG. 4 illustrates a set of two destination volumes 452, 454 for the backup image, but there may be only one, or more than two. The number of write threads, such as write backup image 442, write backup image 444, may be determined by default or explicit settings, according to the number of destination volumes specified for the backup image. Thus, in this example, the selective compression of data subsets is carried out prior to any demultiplexing/multiplexing steps carried out by the backup utility 430. The backup utility 430 may operate substantially as it would without selective compression invoked, although additional metadata relating to the selective compression may need to be passed to the backup utility 430 for inclusion in the backup image metadata. The module of the database management system 400 providing compression (and other types of data transformation) may be implemented as one of the shared components/utilities 150 described in FIG. 1, and the buffer manager 420 and write manager 440 functions may be implemented by the transactional storage manager 110. In other implementations, the buffer manager 420 and write manager 440 functions are provided by the backup utility 430. This may also be the case in the other examples described herein.

The operation of this database management system 400 is illustrated further in methods 500 and 600 of FIGS. 5 and 6, respectively. At 510 in method 500, database data is received in data streams from each source data subset. At 520, the data streams are filtered within the buffer manager 420 to locate any identifiers of data subsets. When an identifier is detected and determined at 530 not to correspond to a flagged data subset, then the data is passed through uncompressed to the backup utility at 550. If the detected identifier is determined to be an identifier for a flagged data subset at 530, then data from that stream is compressed at 540, and then output to the backup utility at 550. Filtering of the incoming data stream continues at 520, so when a next identifier that does not correspond to a flagged data subset is detected, compression stops and the data received in the data stream is sent to the backup utility without compression at 550. In another method 600, in response to the backup command specifying selective compression, a first process or set of processes is initiated to read data from the data subsets flagged for compression at 610, and this first process or set of processes reads and compresses the data received in the data stream for the flagged data subsets at 620. A second process is also initiated, and concurrently or consecutively with the first process or set of processes, reads in data from the other data subsets that are not flagged for compression at 630. At 640, the compressed and uncompressed data is output to the backup utility; this may occur either concurrently or consecutively.

Figure 7:
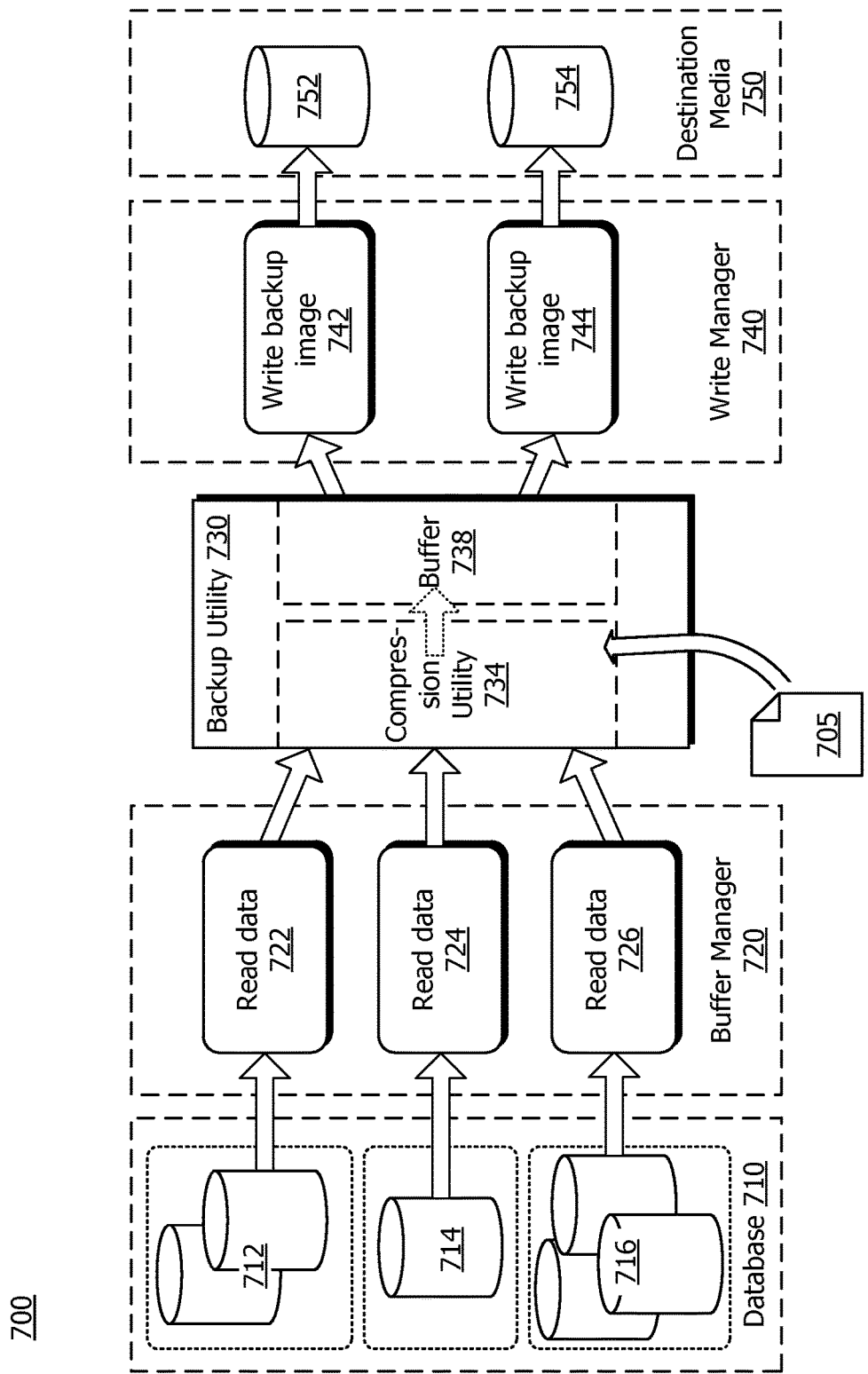
FIG. 7 is a schematic diagram illustrating operation of the example database management system implementing selective compression, in accordance with a second example.

Another example implementation in an example database management system 700 is illustrated in FIG. 7. This example database management system 700 includes a database 710, a buffer manager 720, backup utility 730, write manager 740, and destination media 750. Here, compression is carried out by a compression utility 734 within the backup utility 730. Thus, one or more data streams containing the data subset data to be backed up is read from sources 712, 714, 716 within the database 710 by one or more processes 722, 724, 726 managed by the buffer manager 720. The incoming data streams are passed to the backup utility 730, where they are read by the compression utility 734 prior to demultiplexing and temporary storage in the buffer 738. The compression utility 734, therefore, carries out the filtering and identification of data subsets for compression described above with reference to flagged identifiers 705. Data that does not require compression is passed through to the buffer 738; data requiring compression is compressed by the compression utility 734, then stored in the buffer 738 along with any uncompressed data. The buffer data is then read out via the write manager 740 to one or more destination volumes 752, 754. The backup utility 730 also generates any necessary metadata required for managing the selectively compressed backup image. Thus, in this example, the processes managed by the buffer manager 720 and write manager 740 are substantially unchanged compared to a backup operation where no selective compression is employed; there is no need for the buffer manager 720 to also manage a filtering process to identify flagged data in the data streams.

Figure 8:
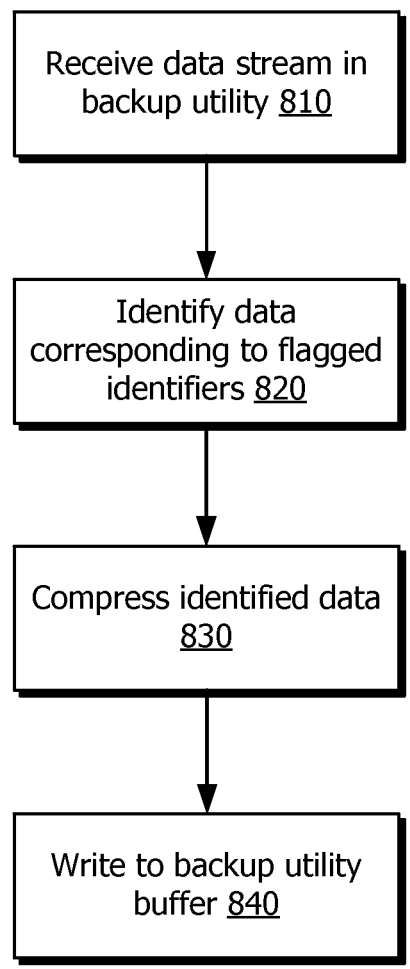
FIG. 8 is a flowchart illustrating a method of selectively compressing data, in accordance with the operation depicted in FIG. 7.

FIG. 8 illustrates a method of operation 800 for the example database management system 700. At 810, the data stream(s) containing the data subsets for backup are received by the backup utility. At 820, the backup utility, and specifically the compression utility, identifies data corresponding to data subsets flagged for compression, then compresses the identified data at 830. At 840, the compressed data (as well as uncompressed data) is written to the backup utility buffer 840.

Figure 9:
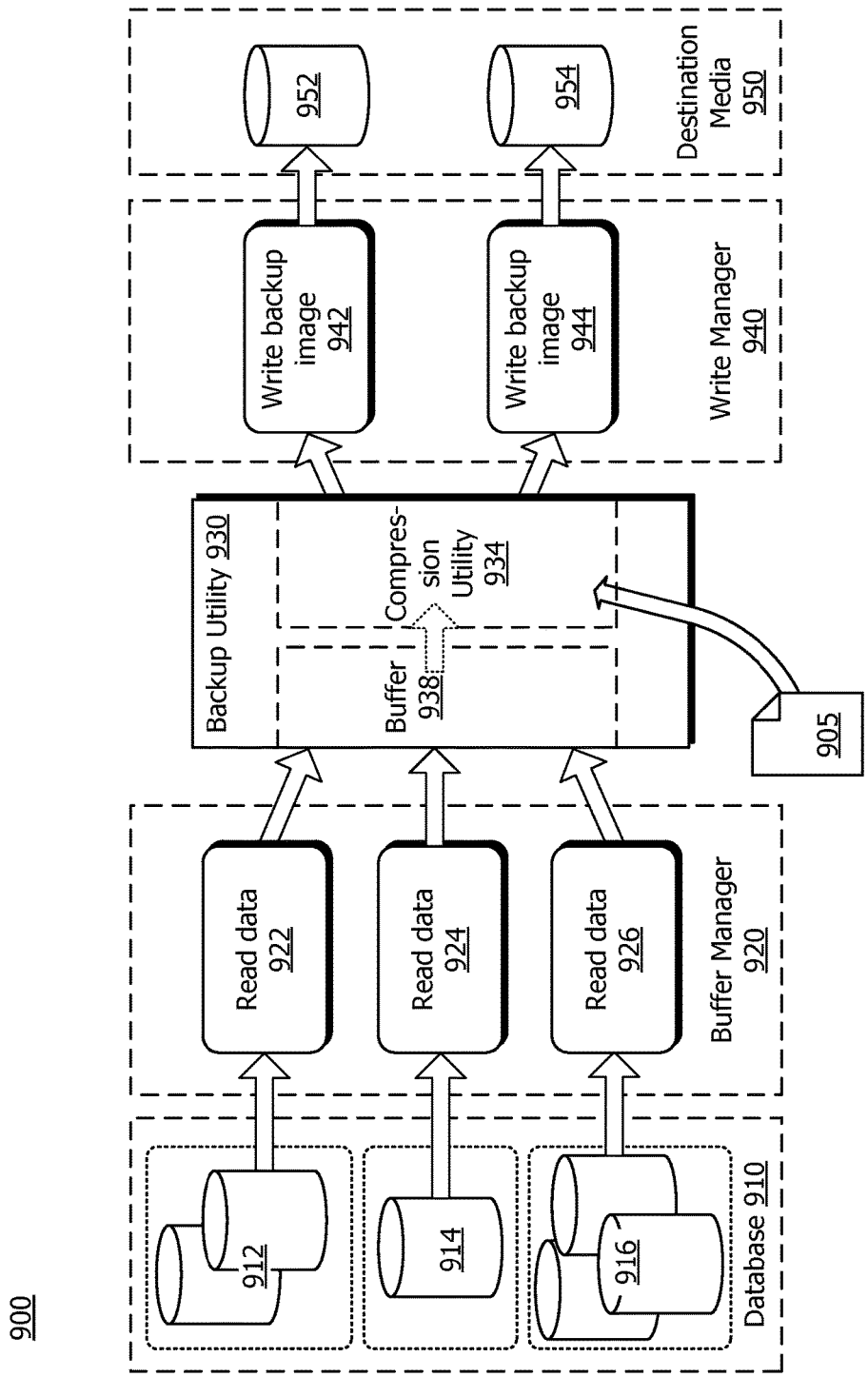
FIG. 9 is a schematic diagram illustrating operation of the example database management system implementing selective compression, in accordance with a third example.

In a variation of the example implementation in FIGS. 7 and 8, the data is compressed within the backup utility, but after any demultiplexing of the data streams received from the database. This is illustrated by example database management system 900 of FIG. 9. This database management system 900 includes a database 910, a buffer manager 920, backup utility 930, write manager 940, and destination media 950. The backup utility 930 includes a compression utility 934 and buffer 938. One or more data streams containing the data subset data to be backed up is read from sources 912, 914, 916 within the database 910 by one or more processes 922, 924, 926 managed by the buffer manager 920. These data streams are stored in the buffer 938 of the backup utility 930. The compression utility 934 then reads in the data from the buffer 938, identifies those parts of the buffer data corresponding to the flagged data subsets using the flagged identifiers 905 and compresses the flagged data. The data, which then includes both compressed and uncompressed portions, is then read out via the write manager 940 to one or more destination volumes 952, 954. Again, the backup utility 930 also generates any necessary metadata required for managing the selectively compressed backup image. Also, again in this example, the processes managed by the buffer manager 920 and write manager 940 are substantially unchanged compared to a backup operation without selective compression.

To facilitate identification of the flagged data, as in the example described with reference to FIG. 6, separate processes may be invoked by the buffer manager 920 for reading in the data from the flagged data subsets in the database 910 resulting in separate data streams for data flagged for compression and data that is not flagged for compression. The data from the different data streams may then be stored in separate files within the buffer 938 so that the compression utility 934 can read in only the data files containing flagged data.

Figure 10:
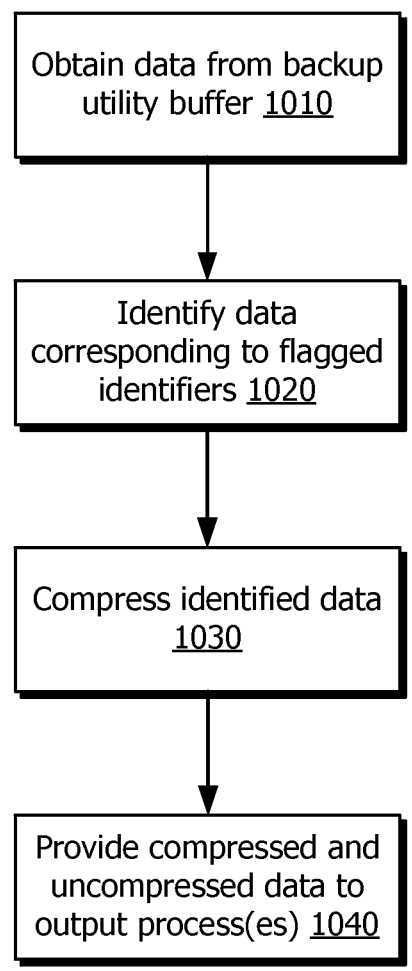
FIG. 10 is a flowchart illustrating a method of selectively compressing data, in accordance with the operation depicted in FIG. 9.

FIG. 10 illustrates a method of operation 1000 for the example database management system 900. Once the data stream(s) have been received in the backup utility buffer, at 1010 the data is read out of the buffer by the compression utility. At 1020, the data corresponding to data subsets flagged for compression is identified, and at 1030 the compression utility compresses the identified data, while remaining data in the buffer remains uncompressed. At 1040, the backup utility outputs the compressed and uncompressed data to the write process(es) that write the backup image to the destination media.

Figure 11:
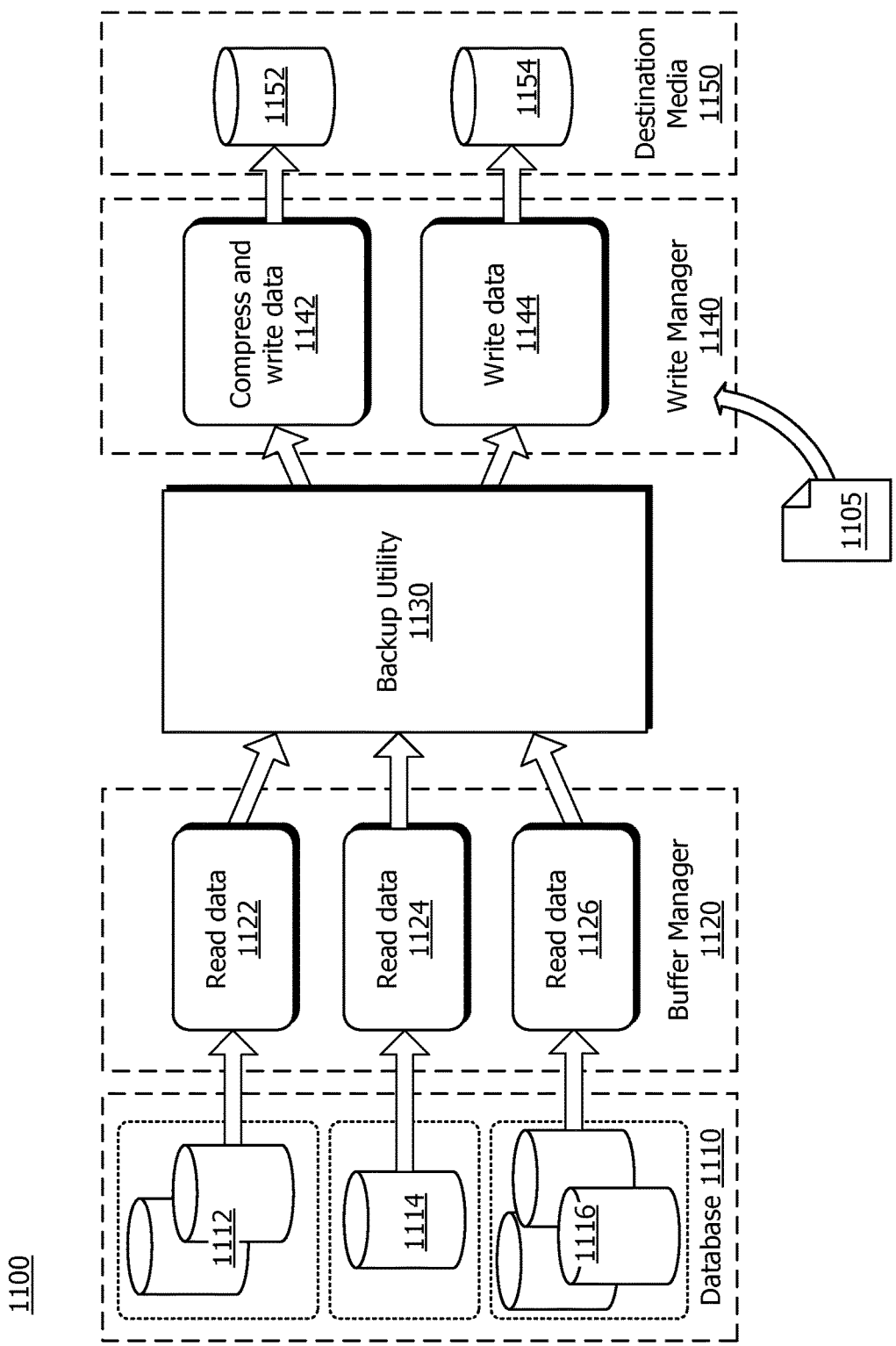
FIG. 11 is a schematic diagram illustrating operation of the example database management system implementing selective compression, in accordance with a fourth example.

In still a further variation, selective compression is carried out after any demultiplexing and other processing by the backup utility. FIG. 11 illustrates another example database management system 1100 including a database 1110, a buffer manager 1120, backup utility 1130, write manager 1140, and destination media 1150 including one or more volumes 1152, 1154. One or more data streams containing the data subset data to be backed up is read from sources 1112, 1114, 1116 within the database 1110 by one or more processes 1122, 1124, 1126 managed by the buffer manager 1120. These incoming streams are passed to the backup utility 1130, which implements any required processing (aside from compression) for the backup image. The backup image data is then passed to processes or sets of processes managed by the write manager 1140. One set of processes 1142 in this case includes compression of flagged subset data received from the backup utility 1130, identified using the flagged identifiers 1105, before writing out to the backup image file. The other process 1144 may simply write the data out to the backup image file.

The process 1142 responsible for compressing the flagged data may also implement the identification of the flagged data by filtering the received data for identifiers, as discussed above. However, the identification of the flagged data can be facilitated if the data flagged for compression is identified during the database read, by one or more of the processes 1122, 1124, 1126, and stored in the backup utility buffer (not illustrated in FIG. 11) in a separate file from the data that does not require compression. When the backup utility 1130 sends the data to be written to the backup image, the write manager 1140 spawns at least two different processes to handle the data flagged for compression and the data not flagged for compression. This particular implementation potentially requires modification to the operation of the buffer manager 1120, backup utility 1130, and write manager 1140, and as such one of the earlier example implementations may be preferred.

Figure 12:
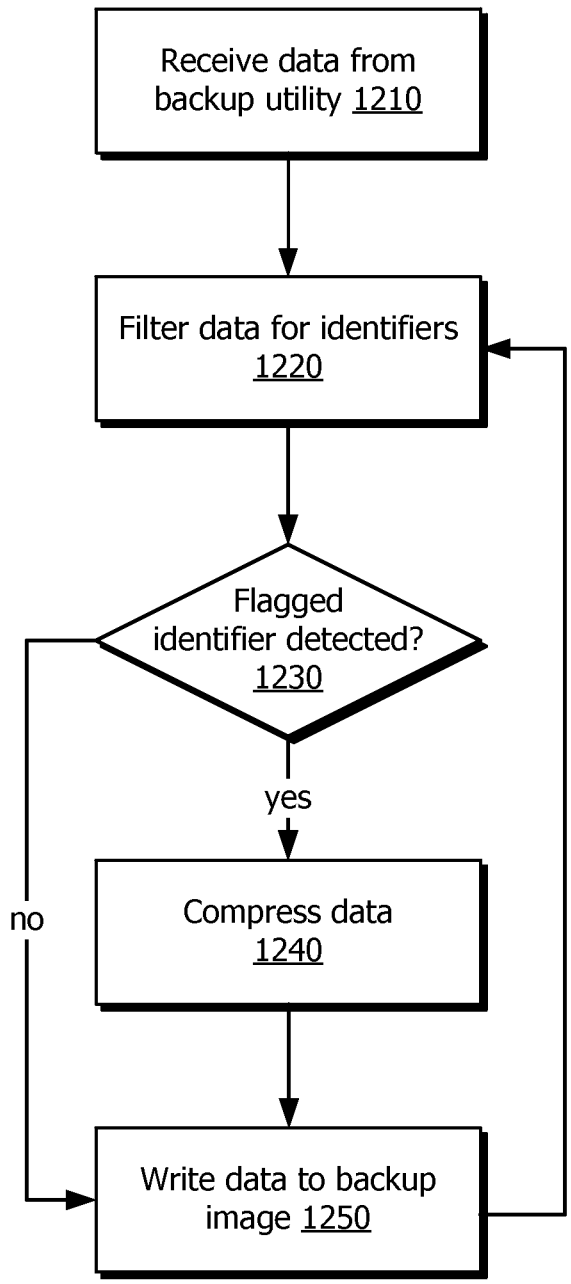
FIG. 12 is a flowchart illustrating a method of selectively compressing data, in accordance with the operation depicted in FIG. 11.

FIG. 12 illustrates the first method of operation 1200 for the example database management system 1100. After the data stream(s) have been received in the backup utility buffer and the backup utility has completed any processing aside from compression, at 1210 the data is received by one or more processes implemented by the write manager. The data is filtered for identifiers at 1220. When a flagged identifier is detected at 1230, the data is compressed at 1240 then written to the backup image at 1250. If another identifier is detected at 1220 and determined not to be a flagged identifier at 1230, then the following data is not compressed, but written directly to the backup image at 1250.

As mentioned above, default settings may be defined for a backup operation. Thus, a BACKUP command with no options may result in compression of all data subsets in the database if compression is enabled by default, or compression of only selected data subsets in the database if selective compression is enabled by default. Where selective compression is enabled by default, or else enabled expressly in a BACKUP command without specifying specific data subsets for compression, the backup utility 160 may be configured to automatically select appropriate data subset candidates for selective compression.

Figure 13:
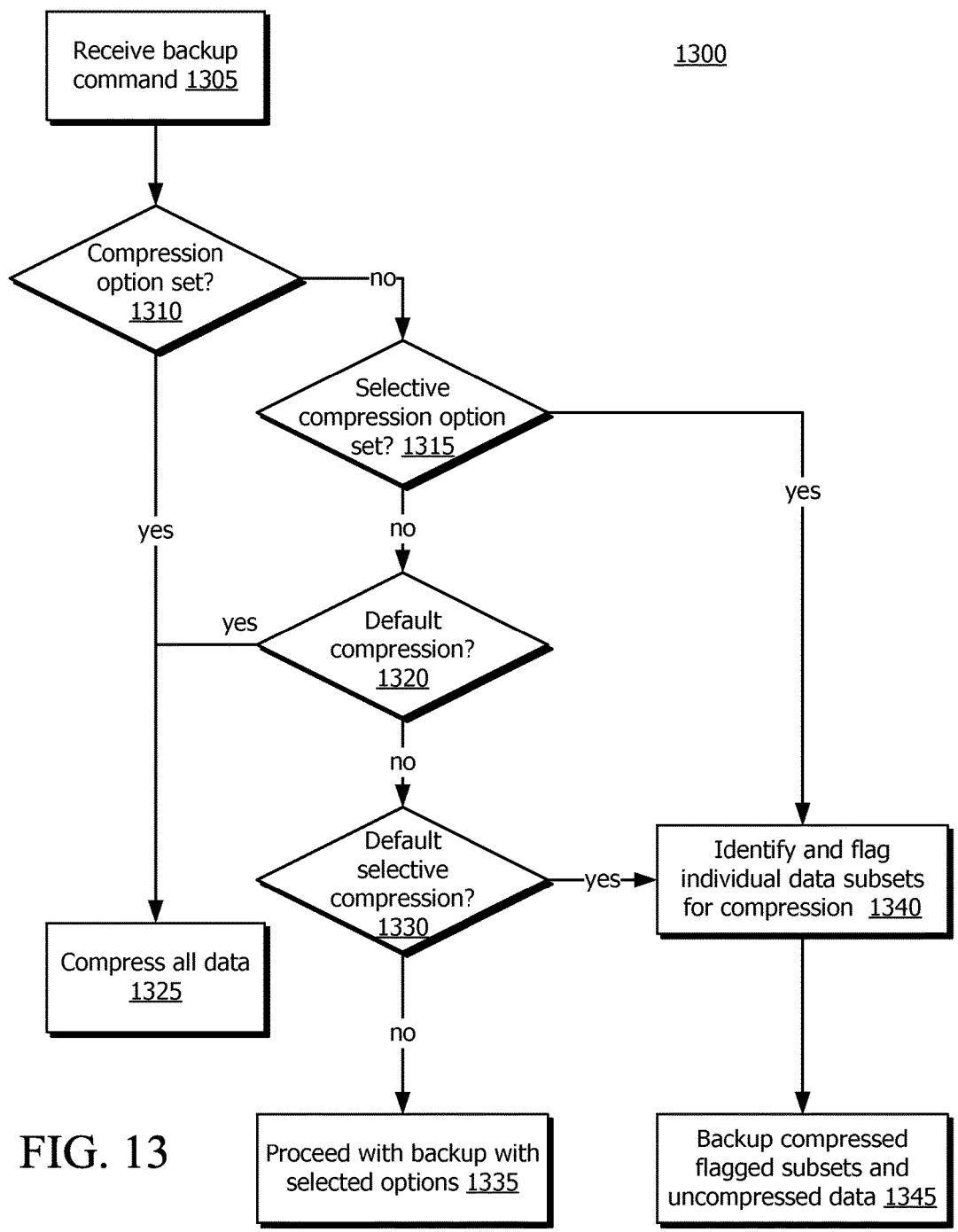
FIG. 13 is a flowchart illustrating identification and implementation of compression options in response to receipt of a backup command.

A method 1300 for parsing default and specific BACKUP commands is illustrated in FIG. 13. The parsing may be carried out by the query processor or the backup utility of a database management system 100. At 1305, a backup command is received, and it is determined whether compression (as opposed to selective compression) is expressly enabled in the command at 1310. If so, then all data targeted by the BACKUP command (either the entire database, or subsets thereof) is compressed at 1325 as part of the backup operation. If not, it is then determined whether selective compression was enabled in the command at 1315.

If neither compression nor selective compression option was expressly set in the BACKUP command, then any compression is implemented in the backup operation according to any predefined default settings. In this example, default compression (i.e., compression of all data) overrides default selective compression; thus, if compression is enabled by default as determined at 1320, then all data in the backup image is compressed at 1325. If neither default compression option is set, as determined at 1330, then the backup operation proceeds without compression in accordance with any other specified options or default settings at 1335.

If selective compression is enabled expressly in the BACKUP command, or else if no express compression setting is enabled but default selective compression is enabled, then at 1340 the database management system 100 or the backup utility 160 identifies and flags data subsets for compression, then proceeds with selective compression and backs up the compressed and uncompressed data at 1345, as described above.

Where selective compression is expressly invoked in the command, the identification of data subsets is based on the subsets specified in the command, if any. However, if no subsets are specified in the command, or if default selective compression is set, candidate data subsets for compression are selected from the set of subsets selected for backup according to different data subset characteristics or features, such as size, data type, compressibility, previous compression, and encryption. These characteristics and their parameters may be defined by an administrator of the database management system, or else defined in an automated optimization process.

For example, a size threshold may be specified; any data subsets falling below the threshold are not compressed while subsets meeting the threshold are compressed. Thus, as part of the identification of data subsets, raw data size information is obtained for the various segments of the database and the size of each data subset (e.g., each table space) is computed and compared with the size threshold. If data type is selected as a criterion, data subsets containing specific types of data (e.g. binaries, large objects) may be excluded from selective compression or included, as the case may be, according to their expected response to compression. Similarly, data subsets may be selected according to their expected compressibility (i.e., response to compression), as may be determined by a test of the data subset, or based on whether the data subset is already compressed (e.g., table-based compression) or encrypted, since depending on the extent of existing compression within the data subset or the type of encryption, additional compression may or may not be efficient. To identify the subsets in these cases, the database management system 100 or backup utility 160 can retrieve metadata for the data subsets (e.g., data types, compression type, encryption type) and compare this metadata against specified parameters. Multiple criteria may be combined in selecting data subsets for compression. Some criteria may be explicitly specified in a BACKUP command; for example, a size threshold or data type may be included as an optional parameter.

The examples and embodiments are presented only by way of example and are not meant to limit the scope of the subject matter described herein. Variations of these examples and embodiments will be apparent to those in the art, and are considered to be within the scope of the subject matter described herein. Some steps or acts in a process or method may be reordered or omitted, and features and aspects described in respect of one embodiment may be incorporated into other described embodiments, while still achieving the desired outcome.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

Throughout the specification, terms such as "may" and "can" are used interchangeably. Use of any particular term should not be construed as limiting the scope or requiring experimentation to implement the claimed subject matter or embodiments described herein. Any suggestion of substitutability of the various types of equipment described herein for other implementation means should not be construed as an admission that the invention(s) described herein are abstract, or that the physical equipment or its components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

What is claimed is:

1. A method of selectively transforming data during a database backup, the method comprising:
   receiving, by one or more computer processors, backup command for a database;
   obtaining, by one or more computer processors, data from a plurality of data subsets of the database, wherein the plurality of data subsets are specified for inclusion in a backup image and at least one of the plurality of data subsets are specified for transformation;
   identifying, by one or more computer processors, the data from the specified at least one data subset via locating, in at least one of one or more datastreams in the plurality of data subsets, data corresponding to an identifier for the specified at least one data subset for transformation;
   transforming, by one or more computer processors, the identified data, wherein transformed data comprises compressed data and untransformed data comprises uncompressed data; and
   outputting, by one or more computer processors, both the transformed data that corresponds to the identifier and untransformed data obtained from at least another one of the plurality of data subsets to a single backup image for the entire database.

2. The method of claim 1, wherein transforming the identified data further comprises encrypting data, wherein the transformed data comprising encrypted data and the untransformed data comprising unencrypted data.

3. The method of claim 1, wherein the plurality of data subsets comprise a plurality of logical storage units defined for the database, the single backup image thus comprising transformed data from at least one logical storage unit and untransformed data from at least one other logical storage unit.

4. The method of claim 3, wherein the plurality of logical storage units comprises a plurality of table spaces.

5. The method of claim 1, wherein:
   obtaining, by one or more computer processors, the data comprises executing one or more threads to obtain the one or more datastreams from the plurality of data subsets; and
   outputting, by one or more computer processors, both the transformed data and untransformed data comprises writing the transformed data and the untransformed data to a backup utility buffer.

6. The method of claim 1, wherein:
   obtaining, by one or more computer processors, the data comprises executing a first thread to obtain a first datastream from the specified at least one data subset and executing a second thread to obtain a second datastream from the least another one of the plurality of data subsets, wherein the transformed data is generated from the first datastream, while the second datastream is untransformed; and
   outputting, by one or more computer processors, both the transformed data and untransformed data comprises writing the transformed data and the untransformed data to a backup utility buffer.

7. The method of claim 1, wherein:
   obtaining, by one or more computer processors, the data comprises executing one or more threads to obtain the one or more datastreams from the plurality of data subsets and writing the datastreams to a backup utility buffer;
   identifying, by one or more computer processors, the data comprises locating data in the backup utility buffer corresponding to an identifier for the specified at least one data subset, wherein the transformed data being generated from the data in the backup utility buffer corresponds to the identifier while remaining buffer data is untransformed; and
   outputting, by one or more computer processors, both the transformed data and untransformed data comprises writing the transformed data and the untransformed data to the single backup image.

8. The method of claim 1, wherein receiving a backup command specifies which one or more of the plurality of data subsets of the database are to be transformed, and identifying the data comprises identifying the one or more data subsets specified in the received backup command.

9. The method of claim 1, wherein receiving a backup command the at least one of the plurality of data subsets for transformation is specified based on a data subset characteristic, wherein the data subset characteristic comprises a threshold size.

10. The method of claim 1, wherein receiving a backup command the at least one of the plurality of data subsets for transformation is specified based on a data subset characteristic, wherein the data subset characteristic comprises a type of data comprised in the data subset.

11. The method of claim 1, wherein in response to the received backup command the at least one of the plurality of data subsets for transformation is specified based on a data subset characteristic, the data subset characteristic comprising a compressibility factor assessed for the data subset.

12. The method of claim 1, wherein in response to the received backup command the at least one of the plurality of data subsets for transformation is specified based on a data subset characteristic, the data subset characteristic comprising encryption.

13. The method of claim 1, wherein the specified at least one data subset comprises previously compressed data.

14. A computer program product for a database management system, the computer program product comprising:
one or more computer readable storage media and program instructions stored on the one or more computer readable storage media, the program instructions comprising:
program instructions to receive backup command for a database;
program instructions to obtain data from a plurality of data subsets of the database, wherein the plurality of data subsets are specified for inclusion in a backup image and at least one of the plurality of data subsets are specified for transformation;
program instructions to identify the data from the specified at least one data subset via locating, in at least one of one or more datastreams in the plurality of data subsets, data corresponding to an identifier for the specified at least one data subset for transformation;
program instructions to transform the identified data, wherein transformed data comprises compressed data and untransformed data comprises uncompressed data; and
program instructions to output both the transformed data that corresponds to the identifier and untransformed data obtained from at least another one of the plurality of data subsets to a single backup image for the entire database.

15. The computer program product of claim 14, wherein transforming the identified data further comprises encrypting data, wherein the transformed data comprising encrypted data and the untransformed data comprising unencrypted data.

16. The computer program product of claim 14, wherein the plurality of data subsets comprise a plurality of logical storage units defined for the database, the single backup image thus comprising transformed data from at least one logical storage unit and untransformed data from at least one other logical storage unit.

17. The computer program product of claim 14, comprises program instructions to wherein:
obtain the data comprises executing one or more threads to obtain the one or more datastreams from the plurality of data subsets; and
output both the transformed data and untransformed data comprises writing the transformed data and the untransformed data to a backup utility buffer.

18. The computer program product of claim 14, comprises program instructions to wherein:
obtain the data comprises executing a first thread to obtain a first datastream from the specified at least one data subset and executing a second thread to obtain a second datastream from the least another one of the plurality of data subsets, wherein the transformed data is generated from the first datastream, while the second datastream is untransformed; and
output both the transformed data and untransformed data comprises writing the transformed data and the untransformed data to a backup utility buffer.

19. A computer system for a database management system, the computer system comprising:
one or more computer processors;
one or more computer readable storage media;
program instructions stored on the computer readable storage media for execution by at least one of the one or more computer processors, the program instructions comprising:
program instructions to receive backup command for a database;
program instructions to obtain data from a plurality of data subsets of the database, wherein the plurality of data subsets are specified for inclusion in a backup image and at least one of the plurality of data subsets are specified for transformation;
program instructions to identify the data from the specified at least one data subset via locating, in at least one of one or more datastreams in the plurality of data subsets, data corresponding to an identifier for the specified at least one data subset for transformation;
program instructions to compress the identified data; and
program instructions to output both the compressed data that corresponds to the identifier and uncompressed data obtained from at least another one of the plurality of data subsets to a single backup image for the entire database.

20. The computer system of claim 19, wherein compressing the identified data further comprises encrypting data, wherein the compressed data comprising encrypted data and the untransformed data comprising unencrypted data.

* * * * *